T. H. LYLE.
EXTENSIBLE CAR STEP.
APPLICATION FILED MAR. 13, 1917.

1,242,828.

Patented Oct. 9, 1917.
2 SHEETS—SHEET 1.

WITNESSES

INVENTOR
T. H. Lyle,
BY Victor J. Evans
ATTORNEY

T. H. LYLE.
EXTENSIBLE CAR STEP.
APPLICATION FILED MAR. 13, 1917.
1,242,828.
Patented Oct. 9, 1917.
2 SHEETS—SHEET 2.
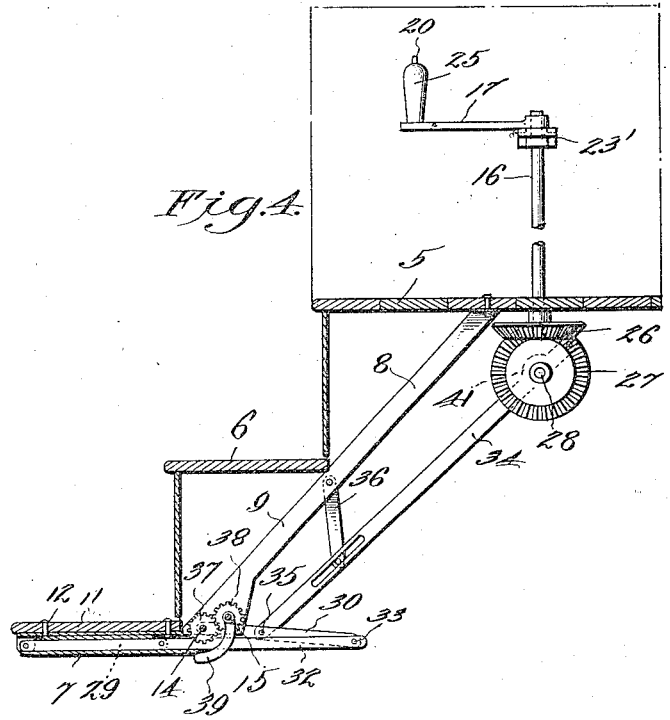
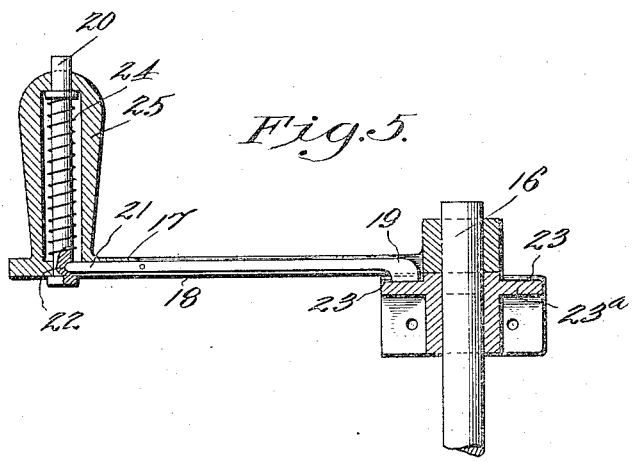
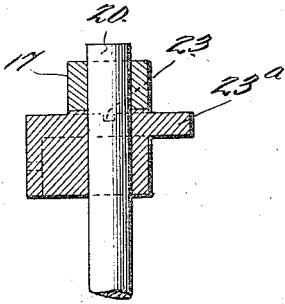
INVENTOR
T. H. Lyle.
BY Victor J. Evans
ATTORNEY
WITNESSES

UNITED STATES PATENT OFFICE.

THOMAS H. LYLE, OF DULUTH, MINNESOTA.

EXTENSIBLE CAR-STEP.

1,242,828.         Specification of Letters Patent.         Patented Oct. 9, 1917.

Application filed March 13, 1917.   Serial No. 154,544.

*To all whom it may concern:*

Be it known that I, THOMAS H. LYLE, a citizen of the United States, residing at Duluth, in the county of St. Louis and State of Minnesota, have invented new and useful Improvements in Extensible Car-Steps, of which the following is a specification.

This invention relates to improvements in extensible car steps of that type adapted to be retracted out of operative position while the car is in motion.

The primary object of the invention is the provision of a device of the above stated character, which may be used in conjunction with the usual stationary steps, in order that an additional step may be provided whenever necessary, to facilitate the descent of passengers from the platform of a car, and the ascent of passengers to such platform.

It is also my purpose to provide an extensible car step, wherein the steps will be normally held in elevated or inactive position against the bottom of the lower step of a set of stationary steps, and means for locking the said extension step in raised or elevated position.

With the above and other objects in view, the invention consists in the novel features, details of construction, and combination of parts, which will hereinafter be more fully set forth, illustrated in the accompanying drawing, and pointed out in the appended claims.

Fig. 4 is a similar view to Fig. 3, showing the extension step in raised position;

Fig. 5 is a detail view of the operating crank illustrating the same in locked position; and Fig. 6 is a detail view of the pitman connected with the gearing, and illustrating the pitman associated therewith in a raised position.

Figure 1:
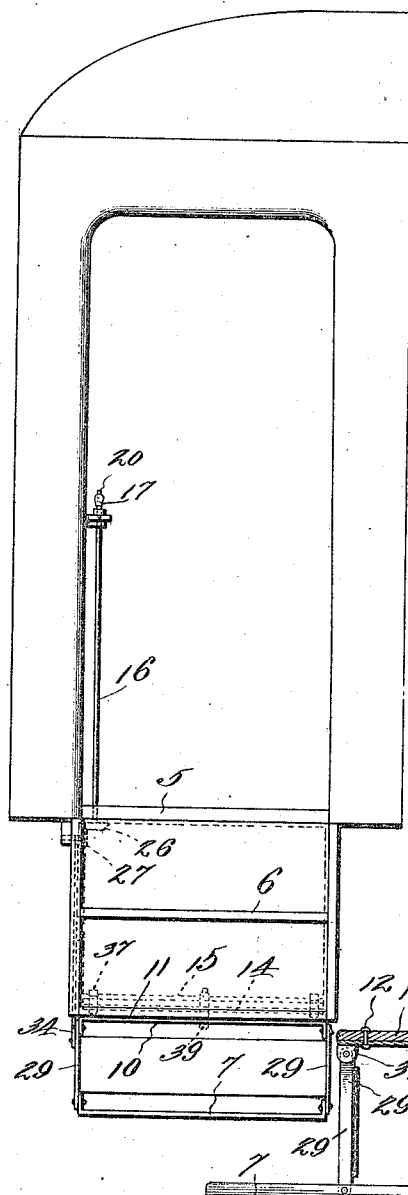
Figure 1 is a side elevation of a car platform provided with my improvement.
Figure 2:
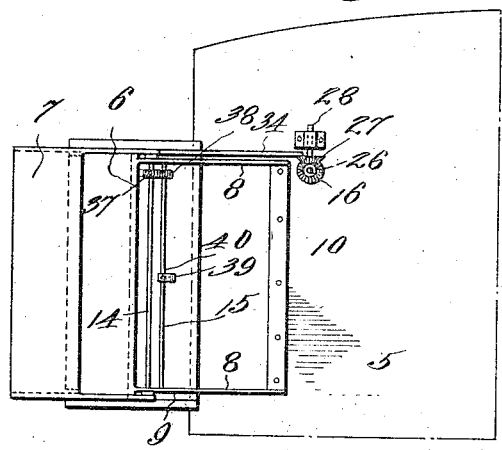
Fig. 2 is a bottom plan view.
Figure 3:
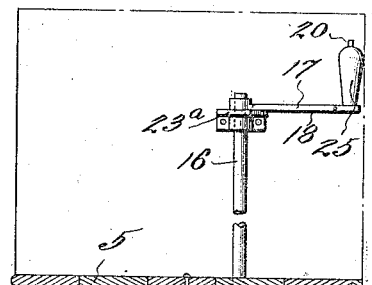
Fig. 3 represents a sectional view through the steps showing the extension step connected therewith in lowered position.
Figure 3:
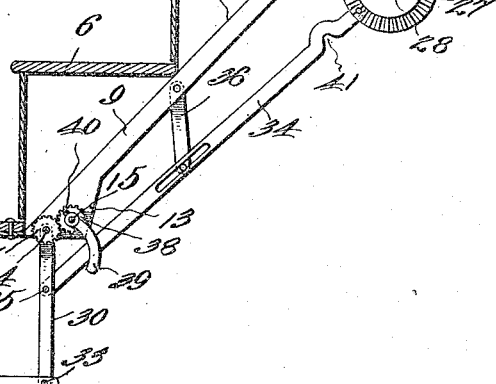

Referring more particularly to the accompanying drawings, in which like characters of reference refer to corresponding parts in the several views, 5 denotes the rear platform of a railway car and 6 the set of stationary steps secured to the platform in any preferred manner, and the bottom step thereof carries an extensible or foldable car step 7. It is the object of this invention to provide improved operating means, wherein the step will be normally held in elevated or inactive position against the bottom of the lowermost stationary step, and which may be readily and quickly lowered to an active position, whenever desired. To this end, use is made of a pair of hangers 8 arranged in parallelism one to the other, and each hanger comprising an upwardly and rearwardly inclined arm 9 and a base plate 10, the said base plate 10 being formed on one of the terminal portions of the hanger, and is secured to the under portion of the lowermost stationary step 11, through the medium of fasteners 12. A broadened connecting portion 13 connects the plate 10 with the arm 8 of the hanger, and has journaled therein a pair of shafts 14 and 15, said shafts extending transversely of and beneath the set of stationary steps 6.

An operating rod 16 extends through the platform 5 of the car and has connected at its upper end an operating crank 17. This operating crank embodies a channeled arm 18 having pivotally connected therein a locking dog 19. This locking dog is operated through the medium of the thumb actuating pin 20. The tail 21 of the dog engages with a notch 22 formed in the lower end of the thumb pin 20, and the head of the dog is adjustably retained in the notches 23 of the cap plate 23ᵃ through the medium of the retractile spring 24. This spring 24 encircles the thumb actuating pin 20, and is located within the hand grip 25. The lower end of the rod 16 protrudes through the platform 5, as previously stated, and carries a beveled gear 26 meshing with the beveled gear 27, the latter mentioned gear being mounted upon the transverse shaft 28 and is operated through the gearing 26.

The extension step is pivotally connected to the hanger 8 through the medium of a riser, comprising a pair of forward links 29 and a pair of rear links 30. The pair of forward links 29 are pivotally connected at their upper extremities to the lugs 31 formed on the base plate 10, while the lower ends of said links are pivotally connected to the inner side face of the channeled arms 32 at a point substantially medially of its length. The rear links 30 are supported on the shaft 14 and have pivotal connection with the inner side face of the channeled arms 32 at one end thereof. These channeled arms 32 are rigidly connected with the tread surface of the extension step 7, and are of such length to extend below and terminate in rear of the lowermost stationary step 11 for permitting of the rear links 30 being pivotally connected therewith at their lowermost terminals, as indicated by the character 33. The upper ends of the latter mentioned links are fixedly secured to the extremities of the shaft 14. A pitman 34 is eccentrically connected with the beveled gear 27 at one end, and is pivotally connected, as indicated by the character 35, to the inner face of the pairs of links 30. The pitman rod 34 is suspended from the hangers 8, and has pivotal connection therewith through the medium of the link 36.

It will, therefore, be seen that by imparting movement to the rod 16 will cause a reciprocation of the pitman rod 34 which in turn will swing the extension step in elevated or inactive position and position the same against the plate 10 of the hangers 8. This movement of the pitman will in turn impart movement to the pinions 37 and 38 in the direction indicated by the arrow, and oscillate the curved dog 39 in a direction toward the extension step 7, and force the same in contact therewith. When this dog 39 has been swung to contact with the extension step 7, such step will be locked in elevated or hoisted position, and prevent any accidental descent of the step when the car is in motion. The said locking dog 39 is fastened on the shaft 15 by a set screw 40. In order to permit of the pitman 34 clearing the shaft 28 when the step 7 is operated, I provide the pitman rod 34 with a notch 41 opening out through the bottom longitudinal edge thereof.

From the foregoing description, taken in connection with the accompanying drawing, the advantages of construction and of the method of operation will be readily apparent to those skilled in the art to which the invention relates, and while I have described the principles of operation of the invention, together with the device which I now consider to be the best embodiment thereof, I desire to have it understood that the device shown is merely illustrative, and that such advantages may be made when desired as are within the scope of the claims appended thereto.

I claim:—

1. In combination with the fixed steps of a railway car, a hanger including a connecting portion secured to said steps, an extension step supported by said hanger, and means for operating said extension, said means comprising a pair of shafts journaled in the connecting portion of said hanger, a pinion on each of said shafts and meshing with one another, manually controlled means for imparting movement to said shafts, and a locking dog having a curved free extremity mounted upon one of said shafts and operable simultaneously with the folding operation of said extension step, the curved extremity of said dog engaging with the bottom surface of the extension step for retaining the latter in folded position.

2. In combination with the fixed steps of a railway car, a hanger including a broadened connecting portion, and a base plate, an extension step having channeled arms, links pivotally connected with the base plate and the channeled arms, a pair of shafts journaled in the connecting portion of said hanger arm, a second pair of links carried by one of said shafts and having pivotal connection with said channeled arm, a pinion on each of said shafts adapted to mesh with one another, manually controlled means for imparting movement to said shafts including a vertically disposed rod, a beveled gear on the lower end of said rod, a second beveled gear adapted to mesh with the latter mentioned gear, a pitman eccentrically connected with the latter mentioned beveled gear and having pivotal connection with the latter mentioned links, and means carried by the other of said shafts for locking the extension steps in an elevated position.

3. In combination with the fixed steps of a railway car, a hanger including a connecting portion secured to said steps, an extension step supported by said hanger, means for operating said extension step including a pitman, means for supporting the pitman on said hanger, and means supported by the connecting portion of the hanger and operable simultaneously upon the operation of the pitman in step closing position for locking the extension step in closed position.

4. In combination with the fixed steps of a railway car, an extension step, means for operating said extension step, said means comprising a vertically disposed rod, a controlling handle connected with the upper end of said rod, means for locking the controlling handle in adjusted position, a beveled gear on the lower end of said rod adapted to mesh with a second beveled gear, a step riser including a pair of rear links, and a pitman eccentrically connected with the last mentioned beveled gear and pivotally connected with said links.

In testimony whereof I affix my signature in presence of two witnesses.

THOMAS H. LYLE.

Witnesses:
SADIE M. BERG,
W. KIRKPATRICK.